United States Patent
Meid et al.

(10) Patent No.: US 11,878,590 B2
(45) Date of Patent: Jan. 23, 2024

(54) TRANSMISSION ARRANGEMENT

(71) Applicant: DEERE & COMPANY, Moline, IL (US)

(72) Inventors: Michael Meid, Waghaeusel (DE); Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 286 days.

(21) Appl. No.: 17/060,377

(22) Filed: Oct. 1, 2020

(65) Prior Publication Data

US 2021/0122226 A1 Apr. 29, 2021

(30) Foreign Application Priority Data

Oct. 24, 2019 (DE) .......................... 102019216407.2

(51) Int. Cl.
| | | |
|---|---|---|
| *B60K 6/547* | (2007.10) | |
| *F16H 3/00* | (2006.01) | |
| *B60K 6/48* | (2007.10) | |

(52) U.S. Cl.
CPC ............. *B60K 6/547* (2013.01); *F16H 3/006* (2013.01); *B60K 2006/4825* (2013.01)

(58) Field of Classification Search
CPC ............ B60K 6/547; B60K 2006/4825; B60K 2006/381; B60K 6/445; F16H 3/006; B60W 20/50; Y02T 10/62
See application file for complete search history.

(56) References Cited

U.S. PATENT DOCUMENTS

| | | | | |
|---|---|---|---|---|
| 6,588,294 B1 * | 7/2003 | Rogg | ................... | F16H 63/3416 |
| | | | | 192/219.5 |
| 8,573,340 B2 * | 11/2013 | Tarasinski | ............... | B60L 50/16 |
| | | | | 475/5 |
| 10,343,691 B2 * | 7/2019 | Prost | ..................... | B60W 10/08 |
| 11,466,776 B2 * | 10/2022 | Kaiserauer | ............ | F16H 63/483 |
| 2004/0176203 A1 * | 9/2004 | Supina | .................... | F16H 3/725 |
| | | | | 903/910 |
| 2009/0029824 A1 * | 1/2009 | Tabata | ................... | B60K 6/405 |
| | | | | 903/945 |
| 2009/0209382 A1 | 8/2009 | Tabata et al. | | |

(Continued)

FOREIGN PATENT DOCUMENTS

| | | | | |
|---|---|---|---|---|
| DE | 102017210563 A1 * | 1/2018 | ............. | B60K 17/28 |
| DE | 102017210563 A1 | 1/2018 | | |

(Continued)

OTHER PUBLICATIONS

English Language Translation of JP-H11157421-A, Jun. 1999, Yoshiaki, et.al. (Year: 1999).*

(Continued)

*Primary Examiner* — Victor L MacArthur

(57) ABSTRACT

A transmission arrangement for a vehicle includes an input gearbox including a first input shaft, a base gearbox connected to an output side of the input gearbox in a direction of a power flow, and a drive unit for rotatably driving a drive shaft at a rotational speed. The drive shaft is drive-connected to a second input shaft of the input gearbox. The transmission arrangement also includes a locking device being transferable into a locking position for arresting a rotation of the second input shaft.

12 Claims, 2 Drawing Sheets

(56) References Cited

U.S. PATENT DOCUMENTS

| | | | |
|---|---|---|---|
| 2015/0184726 A1* | 7/2015 | Rekow | F16H 47/08 |
| | | | 475/5 |
| 2017/0246947 A1* | 8/2017 | Kotloski | B60W 30/192 |
| 2018/0149247 A1* | 5/2018 | Rekow | F16H 47/04 |
| 2019/0118800 A1 | 4/2019 | Cho | |
| 2019/0337376 A1 | 11/2019 | Ore | |
| 2019/0346036 A1 | 11/2019 | Ore et al. | |
| 2021/0025480 A1* | 1/2021 | Galsworthy | F16H 61/688 |

FOREIGN PATENT DOCUMENTS

| | | | | |
|---|---|---|---|---|
| JP | H11157421 A | * | 6/1999 | |
| JP | H11157421 A | * | 6/1999 | |
| WO | WO-2019191797 A1 | * | 10/2019 | B60K 17/28 |
| WO | WO2019191797 A1 | | 10/2019 | |

OTHER PUBLICATIONS

Ore et al., Transmission Assembly With Integrated CVP, Unpublished U.S. Appl. No. 16/555,913, filed Aug. 29, 2019, 36 pages.
European Search Report issued in counterpart application No. 20198097.6 dated Feb. 23, 2021 (08 pages).

* cited by examiner

TRANSMISSION ARRANGEMENT

RELATED APPLICATIONS

This application claims priority to German Application No. 102019216407.2, filed Oct. 24, 2019, the disclosure of which is hereby expressly incorporated by reference in its entirety.

FIELD OF THE DISCLOSURE

The present disclosure relates to a transmission arrangement for a vehicle.

BACKGROUND

The prior art discloses transmission arrangements for agricultural work vehicles which comprise multiple transmission units arranged in series. Such transmission arrangements serve, among other things, to fulfil the exacting requirements demanded of transmission spacing that should be as finely stepped but as wide as possible. Such transmission arrangements may be coupled to an electrical drive unit. Continuously variable split transmissions afford a high degree of flexibility between input speed and output speed. This is achieved through overlapping of the speeds of two different power transmission paths (for example, with planetary gear trains). Here one power transmission path has an output speed capable of varying from the drive speed and is superimposed on the actual drive speed.

There is a need to maintain the functional working of the transmission arrangement even in the event of an operating malfunction of the drive unit.

SUMMARY

According to the present disclosure, the transmission arrangement comprises an input gearbox, a base gearbox connected to the output side of the input gearbox in the direction of the power flow and a drive unit. The input gearbox has a first input shaft. It serves to receive the power output from a combustion engine. In particular, a speed of a combustion engine is provided on the first input shaft. For this purpose, the first input shaft is coupled to the crankshaft of the combustion engine. In addition, the first input shaft is connected directly to the drive unit by a fixed transmission ratio.

The drive unit transmits a speed on a drive shaft which is drive-connected to a second input shaft of the input gearbox. A locking device is furthermore provided, which can be transferred into a locking position for arresting the rotation of the second input shaft. When the locking device is situated in its locking position it arrests or prevents the rotation of the second input shaft so that the latter is situated in an arrested or fixed position. The effect of rotationally arresting the second input shaft is advantageous in a state in which the drive unit, owing to a malfunction or technical defect, can no longer generate any torque for transmitting mechanical power to the base gearbox.

The second input shaft is arrested in order to prevent a possible complete functional failure of the transmission arrangement in the event of such a malfunction or fault. This produces a single, fixed transmission ratio of the input gearbox. Consequently, in the event of a malfunction (for example, an electrical defect in an electrical drive unit), the transmission arrangement is automatically converted into a transmission having the same number of gear steps as the base gearbox itself.

In other words, in the event of a fault a fixed transmission ratio or a single speed step is established in the input gearbox. In combination with the base gearbox, it is thereby possible, in the event of a fault, to continue to operate the transmission arrangement at least in an emergency drive mode and consequently to maintain an emergency running mode for the vehicle. In particular, the vehicle is then at least capable of starting.

The term "malfunction" may encompass various technical faults and defects. For example, it may be a fault in the drive unit itself (for example, the electrical power supply, the supply of hydraulic fluid, or a defect in electrical leads or hydraulic lines). For example, it may be that an electric machine of the drive unit can no longer be supplied with current from a second electric machine. It may also involve an external fault, for example, an interruption in a signal line between a control device (for example, a micro-controller) and the drive unit controlled by this control device. A technical defect in this control device itself is also one possible malfunction.

The drive unit is of electrical or hydraulic design. In the case of an electrical drive unit this in particular comprises two electric machines which are coupled together by an inverter. The two machines may function either as an electric motor or as a generator depending on how they are controlled. In the case of a hydraulic drive unit this comprises two hydraulic machines hydraulically connected to one another.

The input gearbox takes the form, for example, of a planetary transmission. The base gearbox may have one gear step or multiple gear steps. The base gearbox is a manual gearbox, in particular a four-speed manual gearbox.

The locking device is lodged in its locking position by a positively interlocking connection. This serves to prevent power losses within the transmission arrangement during the emergency drive mode.

In order to keep the locking device technically simple and cost-effective, this comprises a locking projection which is movable approximately in the radial direction of the drive shaft and which interacts with a locking groove arranged on the drive shaft or on the drive connection. In particular, this interaction produces a mechanically stable positively interlocking connection between the locking projection and the locking groove.

A stable arresting position of the second input shaft is assisted in that the aforementioned locking projection is oriented in the direction of the locking groove by the spring force of a spring element. This facilitates a reversible engagement of the locking projection in the locking groove. Here the spring element may already be correspondingly pre-tensioned before the locking device is transferred into its locking position. The reversible engagement ensures that the locking device can be transferred back into its starting position once a malfunction has been rectified.

In a further embodiment, the locking device is lodged in its locking position by a frictional connection. This frictional connection or the locking device is embodied in the manner of a friction brake. The drive shaft and the second input shaft of the input gearbox having a drive connection to the former are thereby arrested by frictional means.

The locking device can be manually transferred into its locking position. The driver or user of the vehicle can then intervene manually in person and select an emergency running mode as necessary.

Alternatively, an automatic facility may be provided for transferring the locking device into its locking position. For this purpose, a control unit in particular may be provided, which automatically activates the locking device on detecting or sensing a malfunction.

For an efficient arrest function relative to the second input shaft, the locking device acts on the drive shaft or alternatively on the drive connection between the drive shaft and the second input shaft.

A ratchet wheel, which has at least one locking groove, for example, an external toothing, is arranged rationally fixed on the drive shaft. This wheel affords a mechanically stable and technically simple construction for the locking device.

Alternatively, an external toothing of a gear wheel of the drive connection between the drive shaft and the second input shaft may economically be used as ratchet wheel. This variant is particularly easy to achieve if the drive connection already comprises a pair of mating gears.

In another embodiment, the second input shaft takes the form of a hollow shaft which is arranged coaxially with the first input shaft and thereby supports a proven transmission design.

The transmission arrangement can advantageously be fitted in vehicles. In particular, it can be used in commercial vehicles such as construction machinery or agricultural work vehicles including, for example, tractors.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
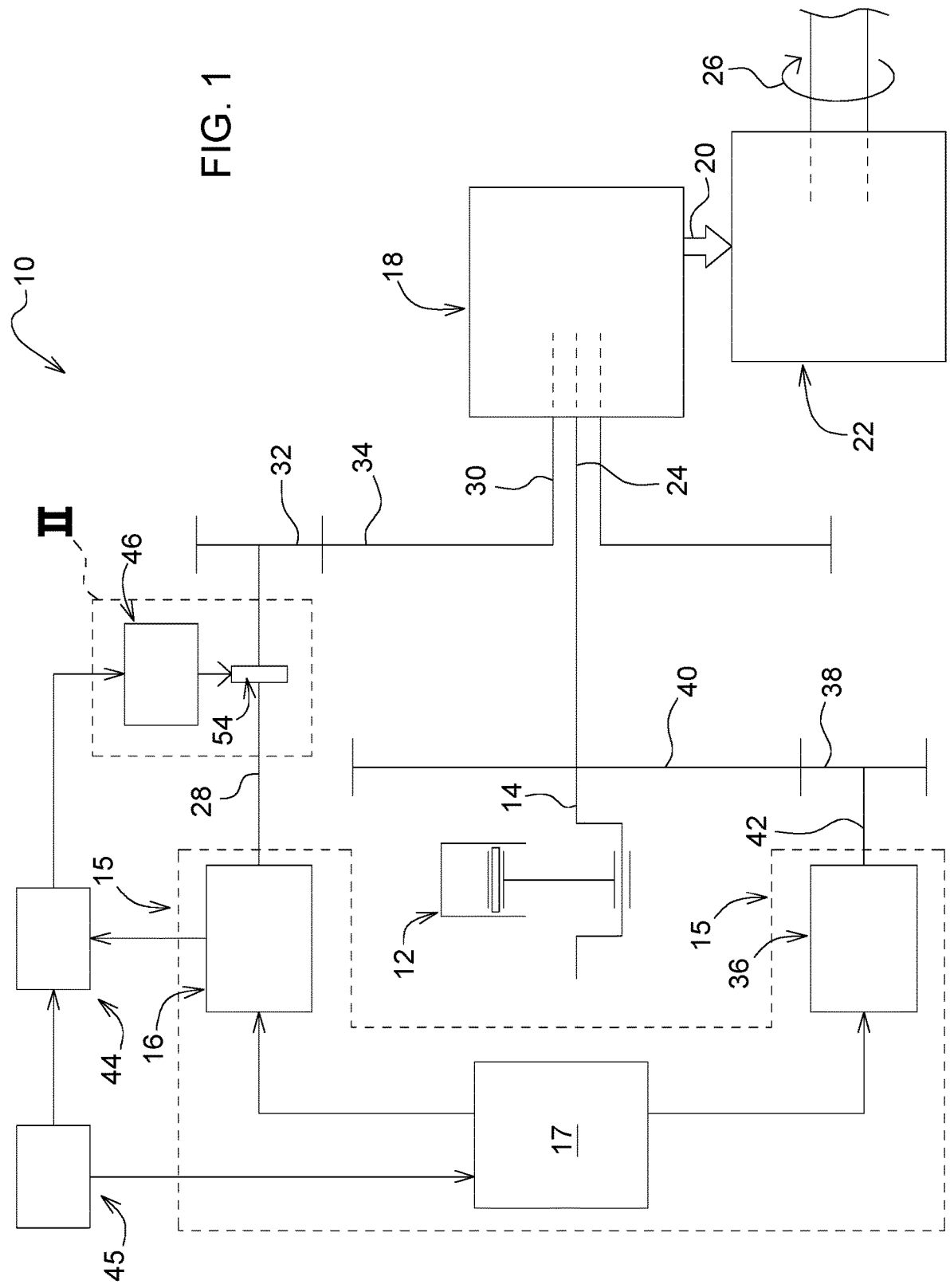
FIG. 1 shows a schematic representation of the transmission arrangement according to the present disclosure.

FIG. 1 schematically shows a transmission arrangement 10. It is fitted into a vehicle (not represented here), for example, in a tractor, the combustion engine 12 and associated crankshaft 14 of which are represented schematically.

The transmission arrangement 10 comprises an electrical transmission having an electrical drive unit 15, an input gearbox 18 and a base gearbox 22 connected to the output side of the input gearbox 18 in the direction of the power flow 20. The crankshaft 14 is coupled to a first input shaft 24 of the input gearbox 18, so that a speed of the combustion engine 12 is provided on the first input shaft 24. The base gearbox 22 comprises an output shaft 26, which transmits mechanical energy to other components of the vehicle. For example, the output shaft 26 takes the form of a differential drive shaft for driving a wheel axle of the vehicle.

The electrical drive unit 15 comprises, in particular, two electric machines 16, 36 and an inverter 17. The drive unit 15 is controlled by a control device 45 in that the latter controls the inverter 17. According to the control signals of the inverter 17, the machines 16, 36 can each be operated either as an electric motor or as a generator. The control device 45 is a micro-controller. It may be used in a suitable embodiment as a control for the entire transmission arrangement 10.

The drive unit 15 or its electric machine 16 drives a drive shaft 28, which is drive-connected to a second input shaft 30 of the input gearbox 18 in the form of a hollow shaft. This drive connection comprises a pair of mating gears having a first gear wheel 32 and second gear wheel 34 meshing with the former. The two input shafts 24, 30 are arranged coaxially with one another.

The two electric machines 16, 36 are electrically connected via the inverter 17. The machine 36 is drive-connected to the crankshaft 14. This drive connection comprises a pair of mating gears having a third gear wheel 38 and fourth gear wheel 40 meshing with the former. The third gear wheel 38 is arranged rotationally fixed relative to a drive shaft 42, while the fourth gear wheel 40 is arranged rotationally fixed relative to the crankshaft 14. The machine 36 is therefore drive-connected to the first input shaft 24 by a fixed transmission ratio.

In the embodiment according to FIG. 1, a control unit 44 detects whether there is a malfunction. This may be a defect within the drive unit 15, for example, a fault in one of the two electric machines 16, 36, a fault of the inverter 17 or a defect in a line connection between these components 16, 17, 36. It may also be a defect in the control device 45.

In the event of a malfunction, the drive unit 15 is no longer capable of impressing a defined speed on the drive shaft 28 or the second input shaft 30. In such a case the control unit 44 transfers a locking device 46 into a locking position. The function of the locking device 46 once a malfunction is detected is to arrest the rotation of the second input shaft 30 and thereby to hold it in an arrested position.

Figure 2:
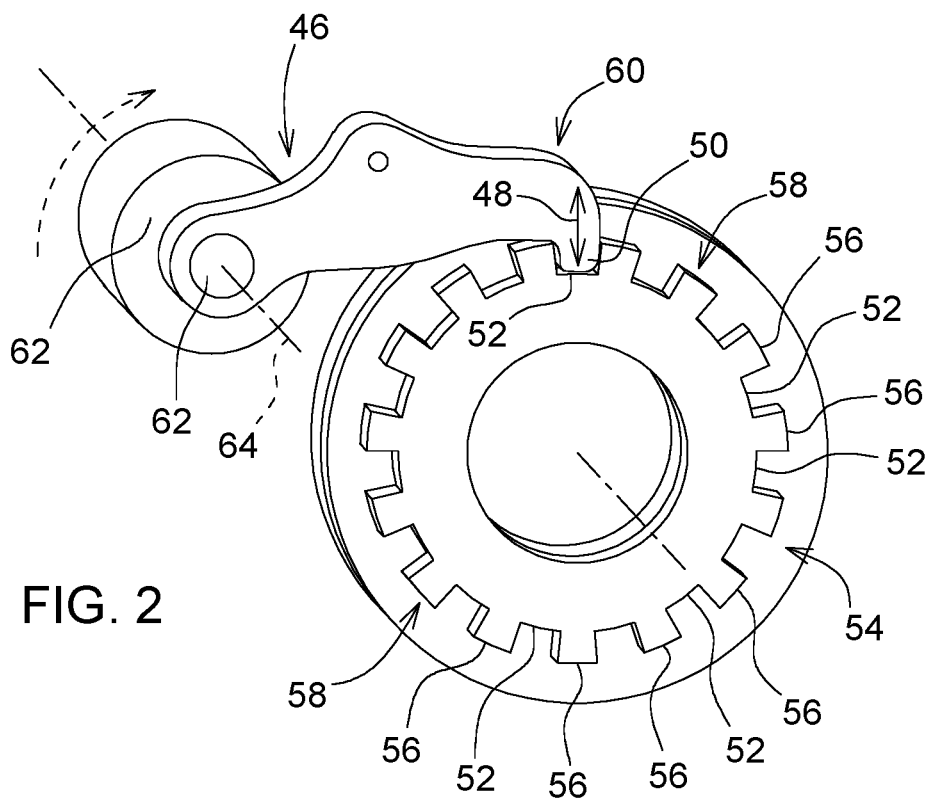
FIG. 2 shows a locking device according to the detail II in FIG. 1 in a first embodiment.

Locking devices of various designs are feasible for arresting the rotation of the second input shaft 30. In the embodiment according to FIG. 1 the locking device 46 acts on the drive shaft 28. For this purpose, the locking device 46 comprises a locking projection 50 movable approximately in a radial direction 48, which interacts with a locking groove 52 arranged on the drive shaft 28 (FIG. 2). The locking groove 52 is an integral part of a ratchet wheel 54, which is rotationally fixed to the drive shaft 28. The ratchet wheel 54 has a multiplicity of locking grooves 52, which are each formed by the tooth spaces of adjacent teeth 56 of an external toothing 58 on the ratchet wheel 54.

The locking projection 50 forms a free end of a pivoted locking lever 60. The latter is rotationally fixed, for example, to a control shaft 62 which is supported so that it can rotate about an axis of rotation 64. The control shaft 62 can then be correspondingly actuated for a rotational movement about the axis of rotation 64. Alternatively, the control shaft 62 may take the form of rotationally fixed axis, on which the locking lever 60 is rotatably supported. The rotational mobility of the control shaft 62 or the pivotal mobility of the locking lever 60 in the direction of a locking groove 52 is assisted by the spring force of one or more spring elements, not represented here. In the embodiment according to FIG. 2, for example, a cylindrical helical coiled spring or torsion spring, fixed in relation to the axis of rotation 64 and pre-tensioned approximately in a radial direction 48, is suitable, the pre-tensioning acting on the locking lever 60 approximately in the radial direction 48 in the direction of the locking groove 52. The arrest position of the second input shaft 30 can be cancelled again through pivoting of the locking lever 46 against the spring force of the spring element used.

Figure 3:
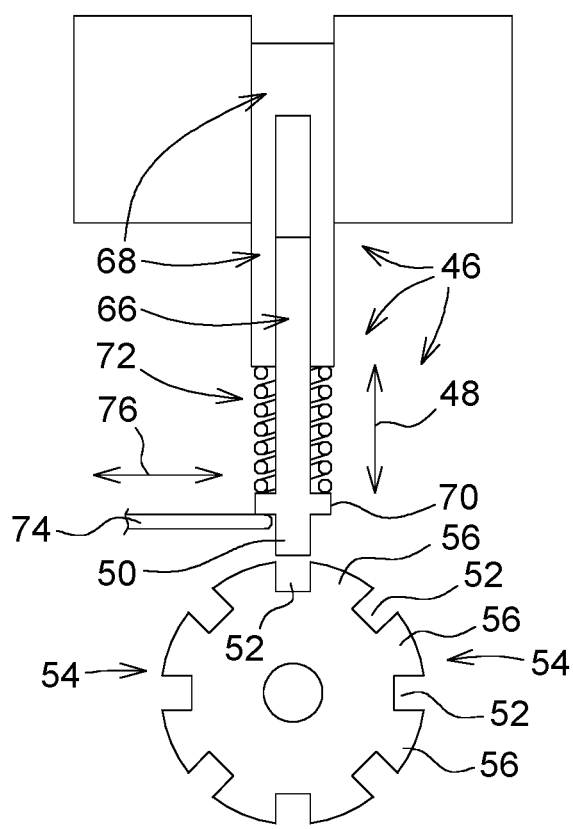
FIG. 3 shows the locking device according to detail II in FIG. 1 in a further embodiment.

FIG. 3 shows a further embodiment of the locking device 46. Here the locking projection 50 takes the form of a free end of a locking piston 66 movable in a radial direction 48. The locking piston 66 is enclosed, guided in its movement inside a guide cylinder 68. Supported between the guide cylinder 68 and a cross web 70 oriented transversely to the locking piston 66 is a spring element 72, which applies spring force to the locking projection 50 in the direction of an associated locking groove 52. For reversible engagement of the locking projection 50 in the locking groove 52, the locking piston 66 or the guide cylinder 68 is moved in the radial direction 48 in the direction of the locking groove 52. The movement of the locking piston 66 may be tripped, for example, by a bolt element 74 when the latter is moved, controlled by the control unit 44 in a transverse direction 76, and thereby removed from the cross web 70. This allows the locking projection 50, impelled by the spring force, to engage automatically in an associated locking groove 52.

It should be further mentioned that some of the details shown in the drawings are represented schematically and not to scale.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A transmission arrangement for a vehicle, comprising:
    an input gearbox including a first input shaft and a second input shaft, the input gearbox including a planetary transmission, the first input shaft connected to an engine, and the first input shaft and the second input shaft arranged coaxially;
    a base gearbox connected to an output side of the input gearbox in a direction of a power flow towards a wheel axle of the vehicle;
    a first electric machine for rotatably driving a drive shaft at rotational speed, the drive shaft being drive-connected to the second input shaft of the input gearbox via a first pair of mating gears in a first fixed transmission ratio, the first pair of mating gears being separate from the base gearbox;
    a second electric machine drive-connected to the first input shaft via a second pair of mating gears in a second fixed transmission ratio, the first electric machine and the second electric machine electrically connected via an inverter, the second pair of mating gears being separate from the base gearbox;
    a locking device being transferable into a locking position for arresting a rotation of the second input shaft; and
    a spring biasing the locking device towards the locking position;
    wherein, when there is a malfunction in at least one of the first electric machine, the second electric machine, and the inverter, the locking device is transferred into the locking position via the spring thereby arresting the rotation of the second input shaft and producing a single fixed transmission ratio of the input gearbox to operate the transmission arrangement in an emergency drive mode.

2. The transmission arrangement according to claim 1, wherein the locking device is disposed in its locking position by a positively interlocking connection.

3. The transmission arrangement according to claim 1, wherein the locking device is manually transferable into its locking position.

4. The transmission arrangement according to claim 1, wherein, when the locking device is in its locking position, it acts on the drive shaft.

5. The transmission arrangement according to claim 1, wherein the base gearbox includes a four-speed manual gearbox.

6. An agricultural vehicle, comprising:
    an engine; and
    a transmission arrangement, comprising:
        an input gearbox including a first input shaft and a second input shaft, the input gearbox including a planetary transmission, the first input shaft connected to the engine, and the first input shaft and the second input shaft arranged coaxially;
        a base gearbox connected to an output side of the input gearbox in a direction of a power flow towards a wheel axle of the vehicle;
        a first electric machine for rotatably driving a drive shaft at rotational speed, the drive shaft being drive-connected to the second input shaft of the input gearbox via a first pair of mating gears in a first fixed transmission ratio, the first pair of mating gears being separate from the base gearbox;
        a second electric machine drive-connected to the first input shaft via a second pair of mating gears in a second fixed transmission ratio, the first electric machine and the second electric machine electrically connected via an inverter, the second pair of mating gears being separate from the base gearbox;
        a locking device being transferable into a locking position for arresting a rotation of the second input shaft; and
        a spring biasing the locking device towards the locking position;
        wherein, when there is a malfunction in at least one of the first electric machine, the second electric machine, and the inverter, the locking device is transferred into the locking position via the spring thereby arresting the rotation of the second input shaft and producing a single fixed transmission ratio of the input gearbox to operate the transmission arrangement in an emergency drive mode.

7. The agricultural vehicle according to claim 6, wherein the locking device is disposed in its locking position by a positively interlocking connection.

8. The agricultural vehicle according to claim 6, wherein the locking device is manually transferable into its locking position.

9. The agricultural vehicle according to claim 6, wherein, when the locking device is in its locking position, the locking device acts on the drive shaft.

10. The agricultural vehicle according to claim 6, wherein the base gearbox includes a four-speed manual gearbox.

11. A transmission arrangement for a vehicle, comprising:
    an input gearbox including a first input shaft and a second input shaft, the input gearbox including a planetary transmission, the first input shaft connected to an engine, the second input shaft being a hollow shaft, and the first input shaft and the second input shaft arranged coaxially;

a base gearbox connected to an output side of the input gearbox in a direction of a power flow towards a wheel axle of the vehicle;

a first electric machine for rotatably driving a drive shaft at rotational speed, the drive shaft being drive-connected to the second input shaft of the input gearbox via a first pair of mating gears in a first fixed transmission ratio, the first pair of mating gears being separate from the base gearbox;

a second electric machine drive-connected to the first input shaft via a second pair of mating gears in a second fixed transmission ratio, the first electric machine and the second electric machine electrically connected via an inverter, the second pair of mating gears being separate from the base gearbox;

a locking device being transferable into a locking position for arresting a rotation of the second input shaft; and a spring biasing the locking device towards the locking position;

wherein, when there is a malfunction in at least one of the first electric machine, the second electric machine, and the inverter, the locking device is transferred into the locking position via the spring thereby arresting the rotation of the second input shaft and producing a single fixed transmission ratio of the input gearbox to operate the transmission arrangement in an emergency drive mode;

wherein, when the locking device is in its locking position, the locking device acts on the drive shaft.

12. The transmission arrangement according to claim 11, wherein the base gearbox includes a four-speed manual gearbox.

* * * * *